(12) United States Patent
Gandhi et al.

(10) Patent No.: US 9,826,402 B2
(45) Date of Patent: Nov. 21, 2017

(54) MOBILE DEVICE MANAGEMENT

(71) Applicant: Verizon Patent and Licensing Inc., Arlington, VA (US)

(72) Inventors: Ashish R. Gandhi, Brentwood, CA (US); Rajeev K. Sadana, Green Brook, NJ (US); Maynard W. Exum, Piscataway, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 430 days.

(21) Appl. No.: 14/679,670

(22) Filed: Apr. 6, 2015

(65) Prior Publication Data

US 2015/0215782 A1   Jul. 30, 2015

Related U.S. Application Data

(63) Continuation-in-part of application No. 13/360,239, filed on Jan. 27, 2012, now abandoned.

(51) Int. Cl.

| G06Q 30/00 | (2012.01) |
|---|---|
| H04W 12/06 | (2009.01) |
| H04W 8/18 | (2009.01) |
| H04W 12/08 | (2009.01) |
| G06Q 20/12 | (2012.01) |
| G06Q 20/32 | (2012.01) |
| G06Q 20/40 | (2012.01) |
| G06Q 30/06 | (2012.01) |

(52) U.S. Cl.
CPC .......... *H04W 12/06* (2013.01); *G06Q 20/12* (2013.01); *G06Q 20/322* (2013.01); *G06Q 20/3223* (2013.01); *G06Q 20/4012* (2013.01); *G06Q 30/06* (2013.01); *H04W 8/18* (2013.01); *H04W 12/08* (2013.01)

(58) Field of Classification Search
CPC .......................................... G06C 30/06–30/08
USPC ................................................ 705/26.1–27.2
See application file for complete search history.

(56) References Cited

U.S. PATENT DOCUMENTS

| 2012/0150750 A1* | 6/2012 | Law ........................ G06Q 20/20 705/76 |
| 2014/0123263 A1* | 5/2014 | Thun ...................... G06F 21/43 726/7 |

* cited by examiner

*Primary Examiner* — Ethan D Civan

(57) ABSTRACT

A device may receive information associated with a particular entity and trigger, based on the information, a status for the particular entity. The device may transmit, based on triggering the status, a list of a plurality of mobile devices and may receive an identified set of mobile devices from the list of the plurality of mobile devices. The device may further receive, from a selected mobile device, a request to perform an action and receive a string of characters from the selected mobile device. The device may further transmit, based on receiving the string of characters, an instruction command to the selected mobile device when the string of characters matches a verification string of characters.

20 Claims, 7 Drawing Sheets

US 9,826,402 B2

1

MOBILE DEVICE MANAGEMENT

RELATED APPLICATION

This application is a continuation-in-part of U.S. patent application Ser. No. 13/360,239, filed Jan. 27, 2012, the entire content of which is hereby incorporated by reference.

BACKGROUND

Mobile devices, such as smartphones, provide an ever-increasing variety of services to users. Mobile devices may download user selectable applications ("apps") from one or more online services. The applications may be applications that are designed by third-party developers and may extend the functionality of the mobile devices.

DETAILED DESCRIPTION OF PREFERRED EMBODIMENTS

The following detailed description refers to the accompanying drawings. The same reference numbers in different drawings may identify the same or similar elements.

Systems and/or methods described herein may provide for the management of passcodes (e.g., a string of characters) for users of mobile devices. A user may have an account, such as an account with a wireless service provider, in which multiple mobile devices, such as multiple smartphones, are registered. The mobile devices may be capable of downloading content, such as applications for the mobile devices, from an online service. Some of the applications may charge fees, which may be billed to the account.

Consistent with aspects described herein, a user may, from one of the mobile devices associated with the account, configure which of the mobile devices are enabled to allow fees for the applications to be billed for the account. For example, select ones of the mobile devices associated with the user's account may be associated with a passcode, such as a personal identification number (PIN), that must be entered by the user before the application can charge a fee to the account associated with the mobile devices. The user may designate other mobile devices, associated with the account, as not being enabled to authorize the charging of fees to the account.

Figure 1:
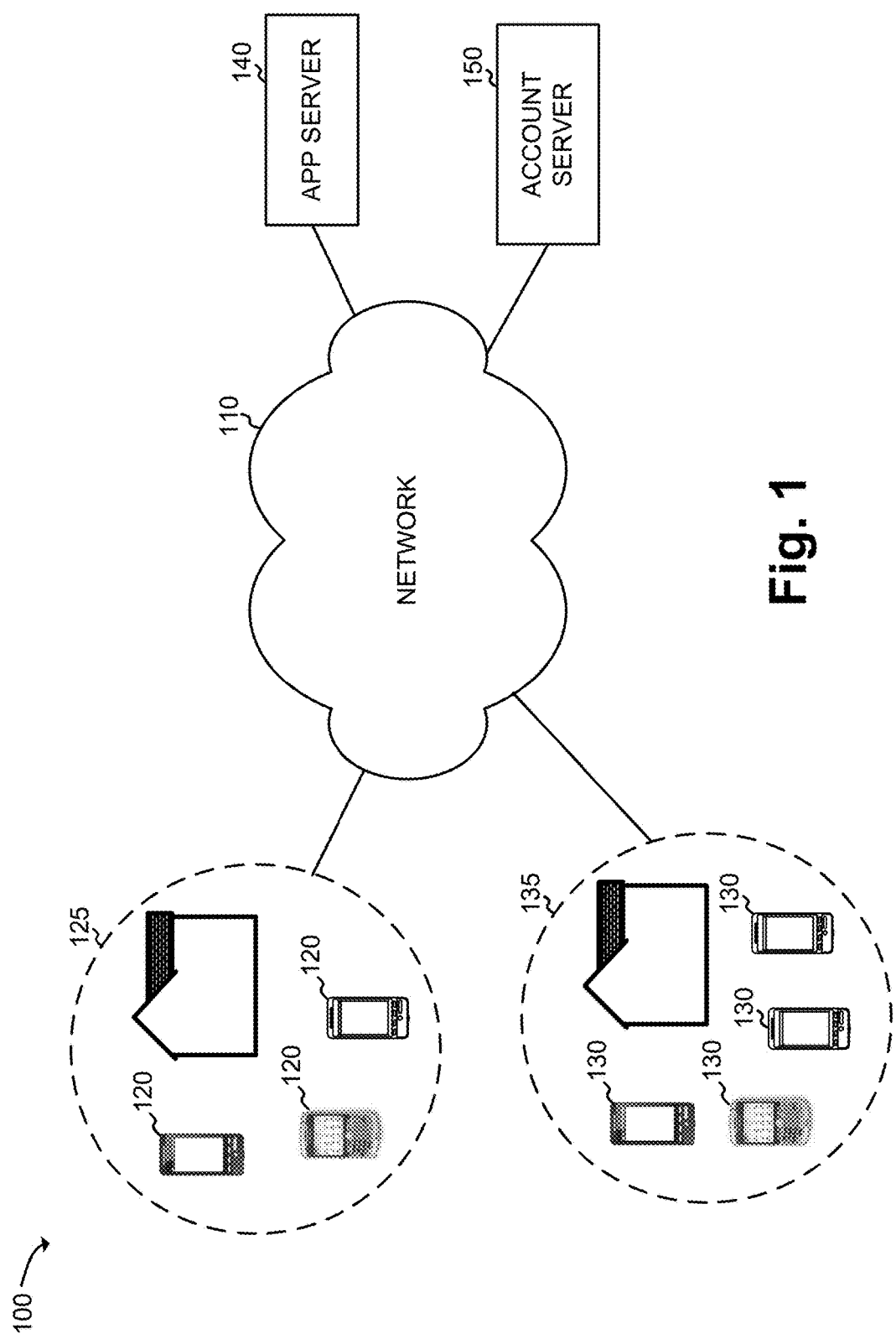
FIG. 1 is a diagram of an example environment in which systems and/or methods described herein may be implemented.

FIG. 1 is a diagram of an example environment 100 in which systems and/or methods described herein may be implemented. As illustrated, environment 100 may include a network 110 that connects a number of devices and/or systems. The devices and/or systems may include mobile devices 120 and 130 and servers 140 and 150.

Network 110 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks. Network 110 may particularly include one or more wireless portions that provide wireless connectivity to mobile devices 120 and 130.

Mobile devices 120 and 130 may include portable computing and communication devices, such as a personal digital assistant (PDA), a smartphone, a cellular phone, a laptop with an integrated connectivity to a cellular wireless network, etc. Mobile devices 120 and 130 may connect, through a radio link, to network 110.

Mobile devices 120 and 130 may be associated with user accounts in which more than one mobile device 120/130 is associated with a single account. For example, mobile devices 120 may be associated with a first account, illustrated as an account 125, corresponding to a first customer premises, and mobile devices 130 may be associated with a second account 135, corresponding to a second customer premises. As particularly shown in FIG. 1, account 125 may be associated with three mobile devices 120, such as three smartphones or tablet computers, and account 135 may be associated with four mobile devices 130.

Environment 100 may additionally include one or more servers 140 and 150, which may be connected to network 110. Servers 140/150 may include, for example, web servers, application servers, or other types of servers that provide services or functionality to mobile devices 120/130. As illustrated, server 140 may include an application (app) server, such as a server that implements an online store or marketplace through which users of mobile devices 120/130 may browse, download, and purchase applications for mobile devices 120/130. The applications provided by application server 140 may generally include a wide variety of applications that are developed by a service provider associated with network 110 and/or by third-party developers. The applications may include, for example, games, productivity utilities, applications that present media (e.g., video, audio, or text) to users, or other types of applications.

Server 150 may include an account server that stores information relating to accounts 125/135. In one implementation, account server 150 may be maintained by a telecommunications provider that provides wireless services for accounts 125/135. Account server 150 may store information such as account login information, account passwords, preferences of users associated with an account, information identifying mobile devices 120/130 that are associated with an account, etc.

Seven mobile devices 120/130 and two servers 140/150 are illustrated as connected to network 110 for simplicity. In practice, there may be additional or fewer mobile devices and/or servers.

In some implementations, serves 140 and/or 150 may be implemented as part of the infrastructure of network 110. For example, account server 150 may be implemented as one or more network devices within a portion of network 110 that provides wireless access to mobile devices 120/130.

Although FIG. 1 shows example components of environment 100, in other implementations, environment 100 may contain fewer components, different components, differently arranged components, or additional components than those depicted in FIG. 1. Alternatively, or additionally, one or more components of environment 100 may perform one or more other tasks described as being performed by one or more other components of environment 100.

Figure 2:
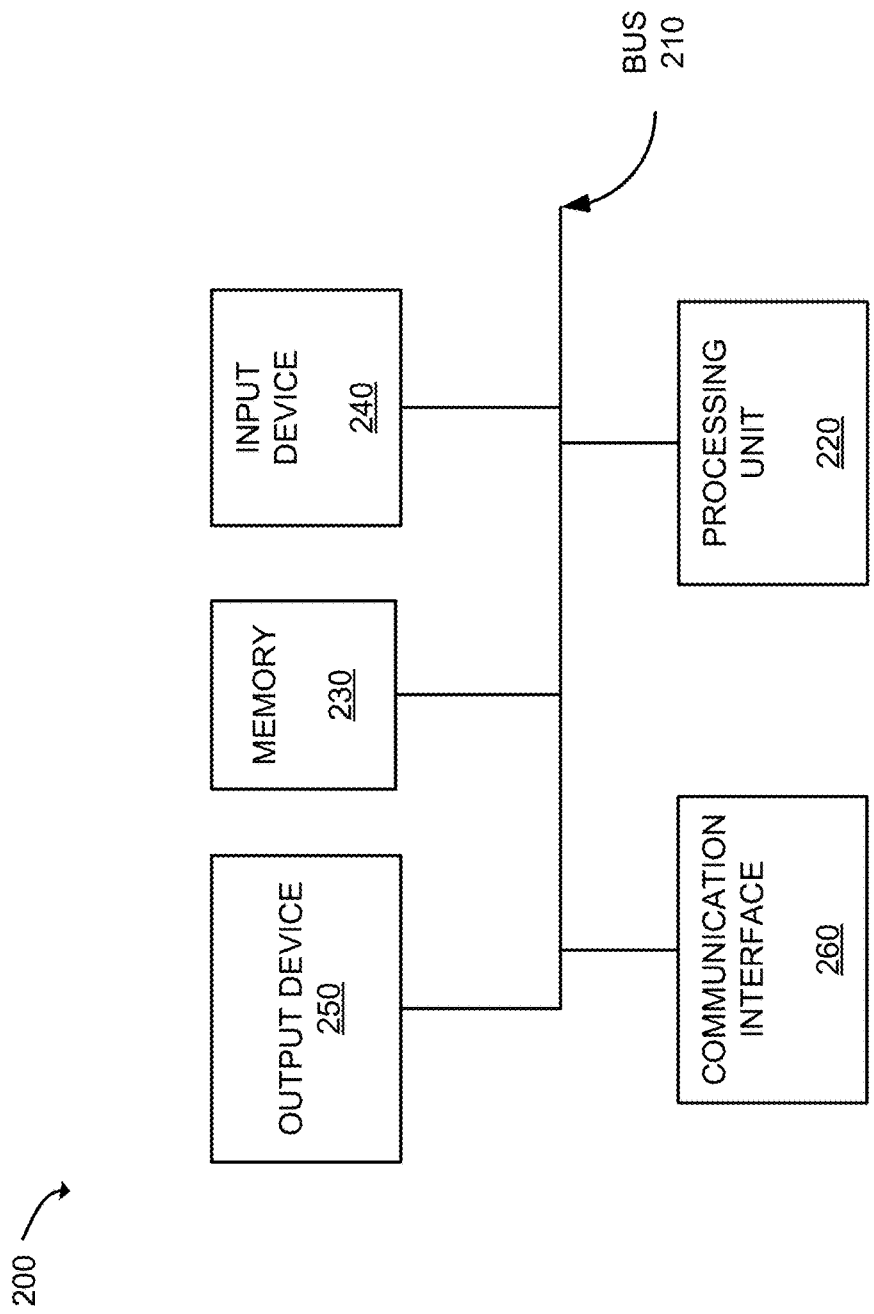
FIG. 2 is a diagram of example components of a device that may correspond to one or more devices of the environment of FIG. 1.

FIG. 2 is a diagram of example components of a device 200 that may correspond to one or more devices of environment 100, such as one of mobile devices 120/130 or servers 140/150. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. Alternatively, or additionally, processing unit 220 may be implemented as or include one or more Application Specific Integrated Circuits (ASICs), Field Programmable Gate Arrays (FPGAs), or the like.

Memory 230 may include a random access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as radio base stations associated with network 110.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
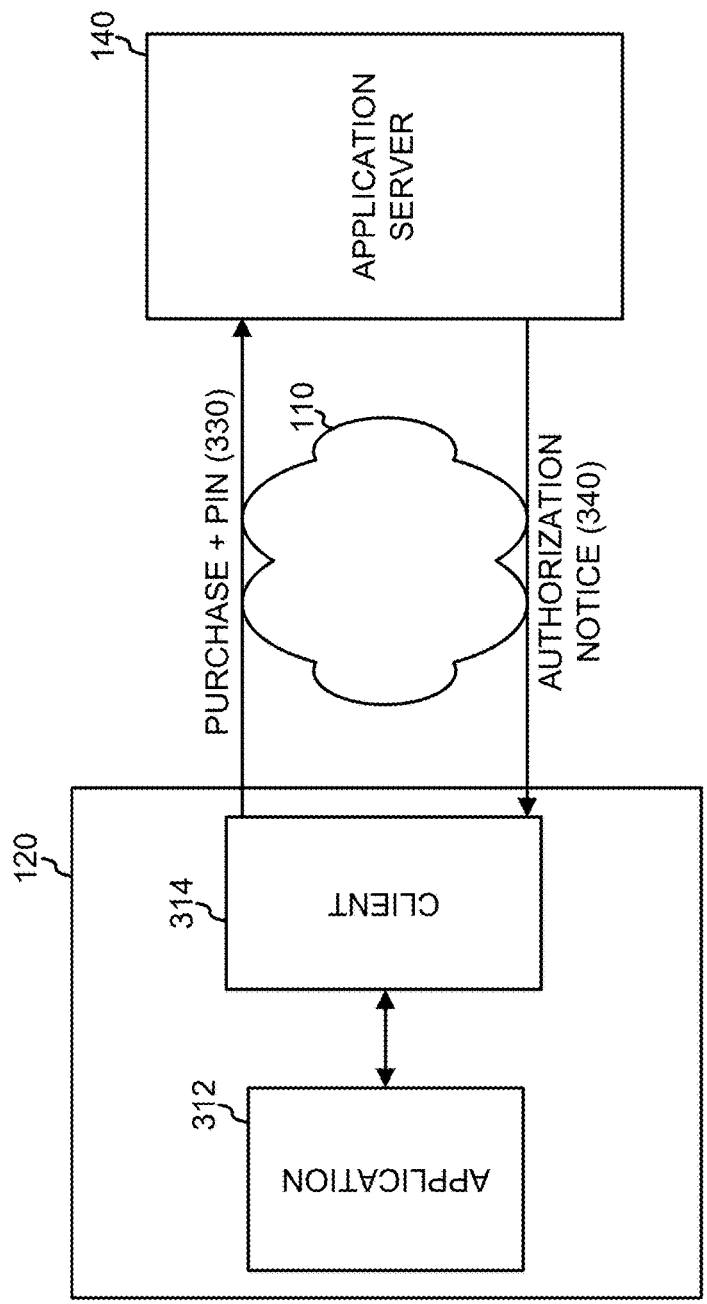
FIG. 3 is a diagram illustrating an example of components that may be implemented by a portion of the environment of FIG. 1.

FIG. 3 is a diagram illustrating an example of components 300 that may be implemented by a portion of environment 100. As shown, components 300 may include mobile device 120 and application server 140.

Mobile device 120 may include a number of software components, such as programs implemented by mobile device 120. An application program 312 and a client 314 are particularly illustrated in FIG. 3. Application program 312 may correspond to an application, such as an application developed by a third-party, that a user has downloaded. For example, application program 312 may have been downloaded from application server 140. Application program 312 may be program that requires the user to purchase application program 312 before downloading. Alternatively, application program 312 may be a free download that may require that the user purchase application program 312 before the user is allowed to use application program 312. Alternatively, or additionally, application program 312 may include functionality or content that may be purchased after application program 312 has been initially downloaded and used. This type of purchase may be referred to as an "in-application" purchase herein. An in-application purchase may be used, for example, by a game application that offers, in game, additional content, for a fee, or a productivity application that offers a set of advanced features for an additional fee. Alternatively or additionally, and in-application purchase may include content that is to be played-back by an application, such as music or video content.

Client 314 may include an application that provides functionality by which application program 312 may charge a user of mobile device 120. Client 314 may provide application program interfaces (APIs) that may be used by application program 312 to communicate with application server 140 (e.g., request a charge to a user's account). Client 314 may be an application that is distributed, by a service provider, with mobile device 120. Thus, client 314 may act as the interface through which third-party applications, such as application program 312, may access application server 140 or access charging functionality to allow a user to make charges to an account.

Application server 140 may implement an online store or marketplace through which users of mobile device 120 may browse, download, and/or purchase applications for mobile device 120. In one implementation, requests, from mobile device 120, to charge an account 125, associated with mobile device 120, may be handled by application server 140.

Communications 330 and 340, shown in FIG. 3, illustrate an example of communications that may occur between mobile device 120 and application server 140, when a user of mobile device 120 wishes to make a purchase, such as a purchase of application 312 or an in-application purchase through a previously installed application. As part of the authentication of the purchase, the user may enter a passcode, such as a PIN (e.g., a three or four digit number). Client 314 may transmit information identifying the purchase and the entered passcode to application server 140 (communication 330, purchase plus PIN). Application server 140 may authenticate mobile device 120, such as by verifying that the passcode corresponds to mobile device 120, and may respond to mobile device 120 to indicate whether the purchase was approved (communication 340, authorization notice).

In the manner shown above, a passcode (e.g., a PIN) may be used to verify purchases from application server 140. The passcode may be a value that is separate from the user's mobile account login information. Multiple mobile devices 120, associated with a single account 125, may use a single passcode. Alternatively, or additionally, different passcodes may be associated with different mobile devices of an account.

Figure 4:
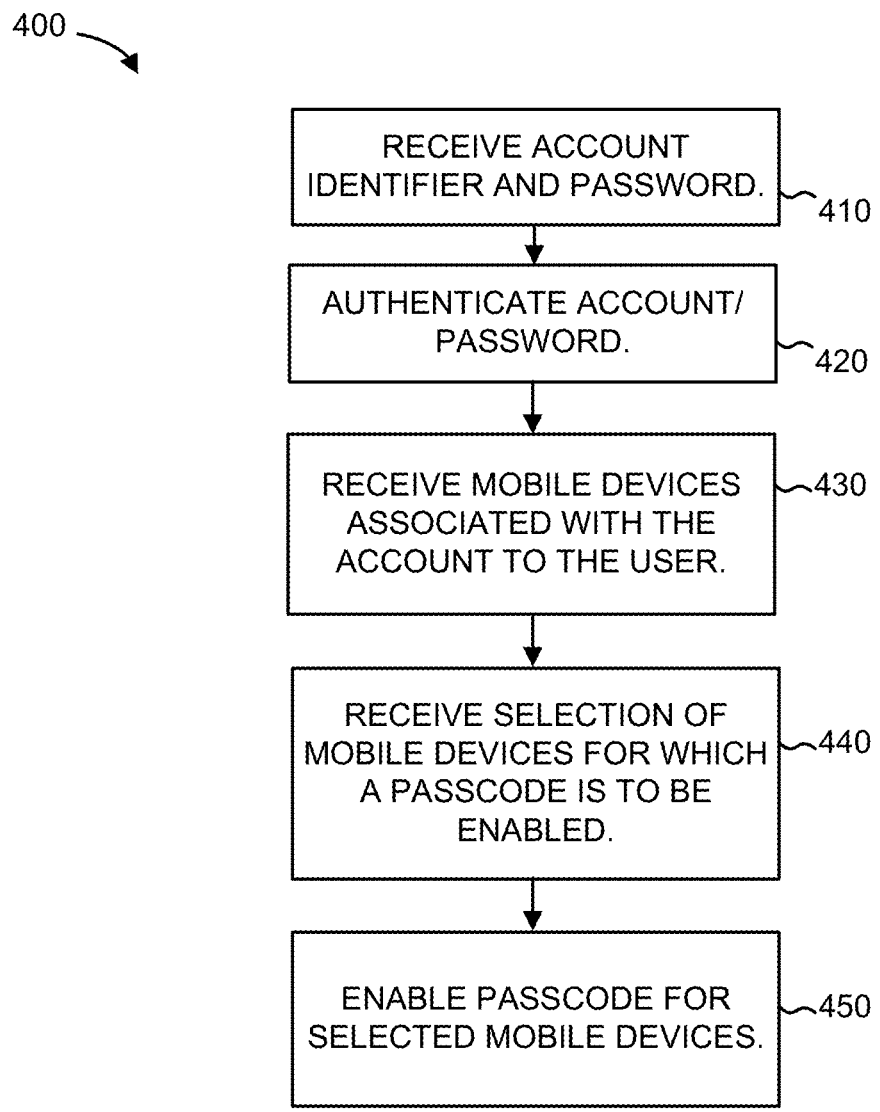
FIG. 4 is a flow chart illustrating an example process for performing passcode management for mobile devices associated with an account.

FIG. 4 is a flow chart illustrating an example process 400 for performing passcode management for mobile devices associated with an account. In one implementation, process 400 may be performed by application server 140. Alternatively, or additionally, some or all of process 400 may be performed by another device or group of devices, such as by application server 140 and account server 150.

Process 400 may include receiving an account identifier and password (block 410). The account identifier and password may be received at application server 140, such as from client 314. In one implementation, the account identifier may be a unique value associated with mobile device 120, such as a mobile directory number (MDN, also referred to as the mobile device's phone number) of mobile device 120. Alternatively, or additionally, the account identifier may include another value that is used to identify mobile device 120 and the account 125 that is associated with mobile device 120. For example, when initially opening an account, a user may provide an e-mail address or other user identifier string that is used to identify the user's account. The user may also have provided a password that is used to authenticate the user's account. The password may be different from the passcode (e.g., PIN) that is used to authorize purchases from application server 140.

Process 400 may further include authenticating the provided account identifier and password (block 420). In one implementation, account server 150 may provide authentication services for mobile devices associated with accounts 125/135. For instance, account server 150 may store, such as in a database or other data structure, the user account identifiers and the corresponding passwords. Alternatively, or additionally, instead of storing the actual passwords, account server 150 may store a hashed version of the passwords. Application server 140 may request authentication of the account identifier and password, which was received by application server 140, from account server 150.

Process 400 may further include providing the mobile devices associated with the account to the user (block 430). In one implementation, when the authentication performed in block 420 is successful (i.e., the account identifier and password are correct), account server 150 may transmit, to application server 140, a list identifying each of mobile devices 120/130 that are associated with the account. For example, the MDNs of each of mobile devices 120/130 may be transmitted to application server 140. Application server 140 may forward the list of MDNs to mobile device 120, such as to an application 312 or client 314.

At mobile device 120, the user of mobile device 120 may be presented with the list of mobile devices associated with the account. The user may also be presented with an option to enable a passcode, such as a PIN, for one or more of the mobile devices. The user may then select mobile devices for which the user would like to associate the passcode. In some implementations, the user may also be given the option to set or change the current passcode.

Referring back to FIG. 4, process 400 may further include receiving the selection of mobile devices for which a passcode is to be enabled (block 440). The selection may be received from mobile device 120, and may include a list of mobile devices determined based on a selection operation that is performed by the user of mobile device 120.

Process 400 may further include enabling a passcode for the selected mobile devices (block 450). Enabling a passcode may include application server 140 permitting mobile devices 120 to purchase content and/or applications from application server 140. Application server 140 may, for example, store the MDNs, and the corresponding passcodes, of all mobile devices that are permitted to make purchases from application server 140. Alternatively, application server 140 may access another device, such as account server 150, when determining whether a received passcode matches the registered passcode for a mobile device.

Figure 5:
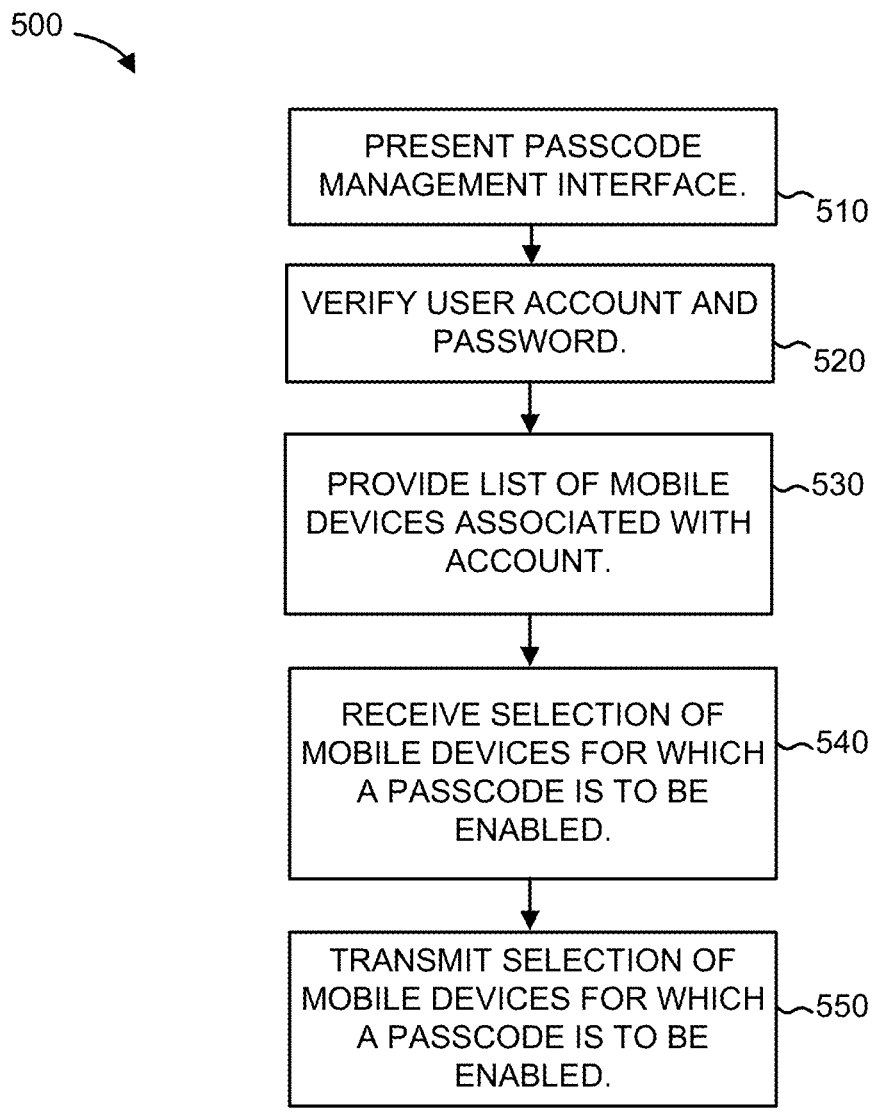
FIG. 5 is a flow chart illustrating an example process for performing passcode management for mobile devices associated with a user account.

FIG. 5 is a flow chart illustrating an example process 500 for performing passcode management for mobile devices associated with a user account. In one implementation, process 500 may be performed by mobile device 120. Alternatively, or additionally, some or all of process 500 may be performed by another device or group of devices, such as by mobile device 130.

Process 500 may include presenting a passcode management interface to a user (block 510). The passcode management interface may include, for example, a graphical interface presented by mobile device 120 in response to initiation of the passcode management interface by the user. In one implementation, the passcode management interface may be implemented as part of client 314. In this case, the user may initiate the passcode management interface while interacting with client 314. Alternatively, or additionally, the passcode management interface may be a web interface that may be viewed through a web browser at a website designed to provide general account management functionality to the user. The passcode management interface may be accessed through any of mobile devices 120 that are associated with a particular account. Alternatively, the passcode management interface may be accessed from another device, such as a web browser executing on a personal computer. For security considerations, it may be desirable to limit presentation of the passcode management interface only to mobile devices 120 that are associated with account 125.

Process 500 may further include verifying the user account and password (block 520). The user may enter an account identifier and a password. The account identifier and the password (or a hash of the password) may be transmitted to application server 140 for authentication. In some implementations, the account identifier may be a unique value associated with mobile device 120, such as the MDN of mobile device 120. In this case, the account identifier may not need to be explicitly entered by the user. Alternatively, or additionally, the account identifier may include another value that is used to identify mobile device 120 and account 125 that is associated with mobile device 120. The password may be different from the passcode (e.g., PIN) that is used to authorize purchases from application server 140.

In response to successful authentication of the account and the password, a list of all mobile devices 120, which are associated with the user's account, may be received. The list may be provided from, for example, application server 140. Mobile device 120 may provide the list, of mobile devices associated with the user's account, to the user (block 530). The list may be provided via a graphical interface presented to the user. Based on the user's interaction with the graphical interface, the user's selection of mobile devices, for which a passcode is to be enabled, may be received (block 540).

Figure 6:
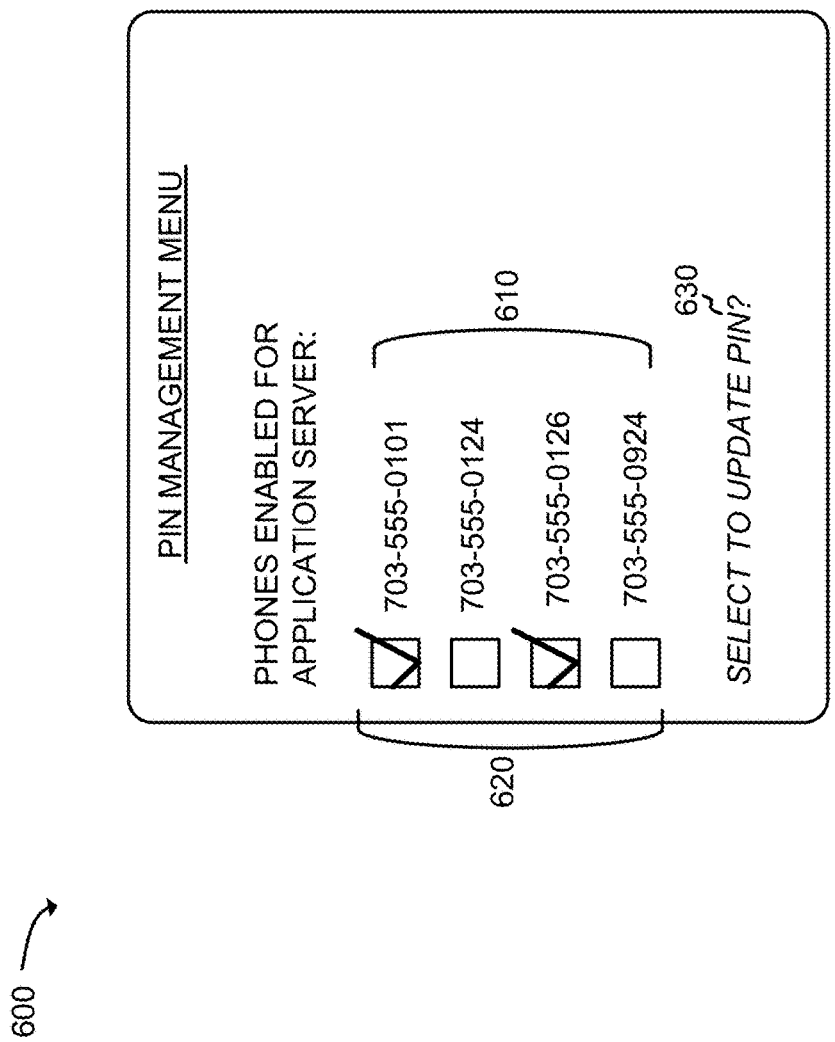
FIG. 6 is a diagram illustrating an example interface, such as a user interface generated by a mobile device associated with a user account, to allow a user to associate passcodes with the mobile device.

FIG. 6 is a diagram illustrating an example interface 600, such as a user interface generated by mobile device 120, to allow a user to associate passcodes with mobile devices associated with the user's account. Interface 600 may be provided by, for example, client 314 or by another application 312 that is installed on mobile device 120. In one implementation, interface 600 may be provided through a web browser provided on mobile device 120.

As illustrated, interface 600 may include a list of each of the mobile devices associated with the user's account. In FIG. 6, mobile devices are identified by the telephone numbers 610 associated with each of mobile devices 120. Corresponding checkboxes 620 may allow the user to select whether a particular mobile device is to be enabled for purchases at application server 140. The user may, for example, select a checkbox, such as through a touch gesture, to enable the mobile device for purchases. The user may also be given the option to change or set a passcode, such as a PIN number, for the account. In interface 600, selection of link 630 may take the user to another interface through which the user may set the passcode associated with the account.

In the example of FIG. 6, four phone numbers are shown. Assume that the four phone numbers correspond to four mobile phones associated with an account for a residential household in which two adults and two children use mobile phones. The owner of the account, such as a parent at the household, may only desire that the adults in the household are given the ability to make purchases at application server 140. Accordingly, only two phone numbers may be selected (phone numbers 703-555-0101 and 703-555-0126). At some point, the owner of the account may want to enable another one of the mobile devices for the household to make purchases at application server 140. At this point, the owner of the account may once again navigate to the pin management menu shown in FIG. 6, such as by executing client 314, to change the mobile devices authorized to make purchases at application server 140. The owner of the account may access the passcode management menu, shown in interface 600, from any of the mobile phones associated with the account. In some implementations, the owner of the account may manage the passcodes for the account from other devices, such as through an interface provided at a personal computer.

Referring back to FIG. 5, mobile device 120 may transmit the selections of the mobile devices for which a passcode to be enabled, such as the selections received from interface 600 (block 550). For example, the MDNs of the selected mobile devices may be transmitted to application server 140.

Figure 7:
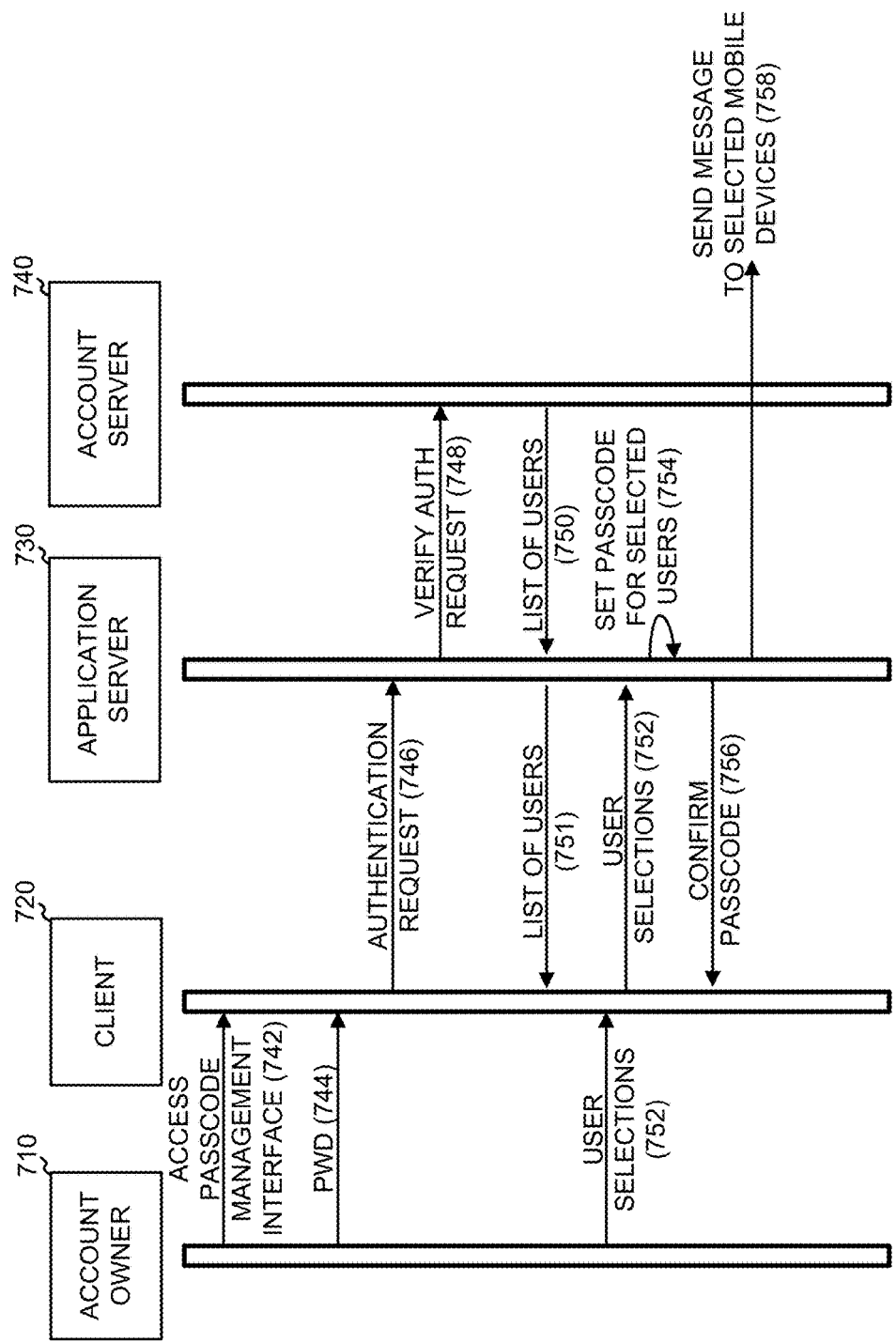
FIG. 7 is a diagram illustrating an example of signal or message flows that may occur during the implementation of the processes shown in FIGS. 4 and 5.

FIG. 7 is a diagram illustrating an example of signal or message flows, over network 110, which may occur during the implementation of the processes shown in FIGS. 4 and 5. A number of entities are shown in FIG. 7, including: an account owner 710, a client 720, an application server 730, and an account server 740. Account owner 710 may correspond to a user of a mobile device, such as the owner of an account that includes one or more mobile devices 120/130. Alternatively or additionally, account owner 710 may correspond to an application, such as application 312, which may be used by the user that owns a mobile device account. Client 720, application server 730, and account server 740 may correspond to client 314, application server 140, and application server 150, respectively.

Account owner 710 may desire to change the passcode for an account or enable/disable one or more mobile devices associated with the account for purchases at application server 730. Account owner 710 may correspondingly access the passcode management interface (communication 742, and block 510 of FIG. 5). The account owner may login to the account, such as by entering a password (PWD) (communication 744, PWD). In some implementations, the account owner may additionally enter a user account name. Alternatively, user account identification information may be provided by default, such as by using the MDN associated with the mobile device being used by the user. In some implementations, the account owner may enter additional information. For example, if the account owner wishes to change the current passcode, the account owner may also enter the new passcode.

Client 720 may contact application server 730 to authenticate the account owner using the supplied password and/or the account identification information (communication 746, authentication request). Application server 730 may contact account server 740 to complete the authentication request (communication 748, verify authentication request). Alternatively, in some implementations, application server 730 may internally complete the authentication request. Account server 740, when the authentication is successful, may respond with a list of all the users associated with the account (communication 750, list of users). For example, the list of all the users may include a list of the telephone numbers (MDNs) that are associated with the account. The list of all the users may be forwarded through application server 730 to client 720 (communication 751, list of users).

Based on the list of users, account owner 710 may select which users are to be allowed to make purchases from application server 730 (communication 752, user selections). Additionally or alternatively, communication 752 may also include an indication of a new or changed passcode that the account owner would like to use for the account. The user selections may be forwarded to application server 730, which may mark the selected users as users that are enabled to make purchases from application server 730. A message may be transmitted back to account owner 710 and/or client 720 to confirm the passcode set up (communication 756, confirm passcode).

In some implementations, a message may be sent to the other selected mobile devices (communication 758, send message to selected mobile devices), such as a message to confirm that the mobile device has been enabled to make purchases from application server 730. The message may be, for example, a Short Message Service (SMS) text message. As an example, the message may include the text "Your phone has been enabled to make purchases from the online app store, contact the account owner to obtain the PIN."

As described above, a user of a mobile device may manage the ability, of all the mobile devices associated with the user's account, to make purchases at an online application store. The purchases may be charged to the user's monthly account. Through a graphical interface, the user may be presented with a list of all mobile devices for the account, and a checkbox to indicate which mobile devices should be enabled to charge purchases. The user may interact with the interface at any of the mobile devices associated with the account, which can be useful in situations in which the user's main mobile device is not capable of providing a graphical interface.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4 and 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by one or more devices, first information associated with a particular entity,
      the first information including second information associating the particular entity with a plurality of mobile devices, and
      the particular entity being associated with a verification string of characters;
   triggering, by the one or more devices and based on the first information, a first status for the particular entity;
   transmitting, by the one or more devices and based on triggering the first status, a list of the plurality of mobile devices,
      the list being provided, for presentation, on another device,
         the other device being different than the one or more devices;
   receiving, by the one or more devices and from the other device, an identified set of mobile devices from the list of the plurality of mobile devices;
   receiving, by the one or more devices and from a selected mobile device of the set of mobile devices, a request to perform an action;
   receiving, by the one or more devices and based on receiving the request to perform the action, a string of characters from the selected mobile device; and
   transmitting, by the one or more devices and based on receiving the string of characters, an instruction command, to the selected mobile device and associated with performing the action, when the string of characters matches the verification string of characters.

2. The method of claim 1, where the list is provided, for presentation, when a user, associated with the particular entity, requests the list from a mobile device, of the plurality of mobile devices, that is associated with the particular entity.

3. The method of claim 1, further comprising:
   enabling the selected mobile device to perform the action,
   where, when receiving the request to perform the action, the method includes:
      receiving the request to perform the action based on enabling the selected mobile device to perform the action.

4. The method of claim 3, further comprising:
   transmitting a message to the selected mobile device,
      the message indicating that the selected mobile device is enabled to perform the action.

5. The method of claim 3, where, when enabling the selected mobile device to perform the action, the method includes:
   changing the verification string of characters.

6. The method of claim 1, where the first information includes an account string of characters,
   the account string of characters being different than the verification string of characters.

7. The method of claim 1, where the list includes information identifying a respective phone number associated with each mobile device of the plurality of mobile devices.

8. A non-transitory computer-readable medium storing instructions, the instructions comprising:
   one or more instructions that, when executed by a processor of a device, cause the processor to:
      receive first information associated with a particular entity,
         the first information including second information associating the particular entity with a plurality of mobile devices, and
         the particular entity being associated with a verification string of characters;
      trigger, based on the first information, a first status for the particular entity;
      transmit, based on triggering the first status, a list of the plurality of mobile devices,
         the list being provided, for presentation, on another device,
            the other device being different than the device;
      receive, from the other device, an identified set of mobile devices from the list of the plurality of mobile devices;
      receive, from a selected mobile device of the set of mobile devices, a request to perform an action;
      receive, based on receiving the request to perform the action, a string of characters from the selected mobile device; and
      transmit, based on receiving the string of characters, an instruction command, to the selected mobile device and associated with performing the action, when the string of characters matches the verification string of characters.

9. The non-transitory computer-readable medium of claim 8, where the list is provided, for presentation, when a user, associated with the particular entity, requests the list from a mobile device, of the plurality of mobile devices, that is associated with the particular entity.

10. The non-transitory computer-readable medium of claim 8, where the instructions further include:
    one or more instructions to enable the selected mobile device to perform the action,
    where the one or more instructions to receive the request to perform the action further include:

one or more instructions to receive the request to perform the action based on enabling the selected mobile device to perform the action.

11. The non-transitory computer-readable medium of claim 10, where the instructions further include:
one or more instructions to transmit a message to the selected mobile device,
the message indicating that the selected mobile device is enabled to perform the action.

12. The non-transitory computer-readable medium of claim 10, where the one or more instructions to enable the selected mobile device to perform the action further include:
one or more instructions to change the verification string of characters.

13. The non-transitory computer-readable medium of claim 8, where the first information includes an account string of characters,
the account string of characters being different than the verification string of characters.

14. The non-transitory computer-readable medium of claim 8, where the list includes information identifying a respective phone number associated with each mobile device of the plurality of mobile devices.

15. A device comprising:
a memory to store instructions; and
a processor execute the instructions to:
receive first information associated with a particular entity,
the first information including second information associating the particular entity with a plurality of mobile devices, and
the particular entity being associated with a verification string of characters;
trigger, based on the first information, a first status for the particular entity;
transmit, based on triggering the first status, a list of the plurality of mobile devices,
the list being provided, for presentation, on another device,
the other device being different than the device;
receive, from the other device, an identified set of mobile devices from the list of the plurality of mobile devices;
receive, from a selected mobile device of the set of mobile devices, a request to perform an action;
receive, based on receiving the request to perform the action, a string of characters from the selected mobile device; and
transmit, based on receiving the string of characters, an instruction command, to the selected mobile device and associated with performing the action, when the string of characters matches the verification string of characters.

16. The device of claim 15, where the list is provided, for presentation, when a user, associated with the particular entity, requests the list from a mobile device, of the plurality of mobile devices, that is associated with the particular entity.

17. The device of claim 15, where the processor is further to:
enable the selected mobile device to perform the action,
where the processor, when receiving the request to perform the action, is further to:
receive the request to perform the action based on enabling the selected mobile device to perform the action.

18. The device of claim 17, where the processor is further to:
transmit a message to the selected mobile device,
the message indicating that the selected mobile device is enabled to perform the action.

19. The device of claim 17, where the processor, when enabling the selected mobile device to perform the action, is further to:
change the verification string of characters.

20. The device of claim 15, where the list includes information identifying a respective phone number associated with each mobile device of the plurality of mobile devices.

* * * * *